(12) United States Patent
Aghadavoodi Jolfaei

(10) Patent No.: US 9,774,659 B2
(45) Date of Patent: Sep. 26, 2017

(54) BI-DIRECTIONAL CHANNEL-BASED PROGRESS INDICATOR

(71) Applicant: Masoud Aghadavoodi Jolfaei, Walldorf (DE)

(72) Inventor: Masoud Aghadavoodi Jolfaei, Walldorf (DE)

(73) Assignee: SAP SE, Walldorf (DE)

(*) Notice: Subject to any disclaimer, the term of this patent is extended or adjusted under 35 U.S.C. 154(b) by 300 days.

(21) Appl. No.: 14/062,571

(22) Filed: Oct. 24, 2013

(65) Prior Publication Data

US 2015/0120805 A1 Apr. 30, 2015

(51) Int. Cl.
*G06F 15/16* (2006.01)
*H04L 29/08* (2006.01)

(52) U.S. Cl.
CPC ............ *H04L 67/10* (2013.01); *H04L 67/142* (2013.01)

(58) Field of Classification Search
CPC ..... H04L 67/10; H04L 12/66; H04L 12/6418; H04L 12/5645; H04L 12/4633; H04L 45/02; H04W 8/04; G06F 9/542; G06F 9/546
USPC ........ 709/203, 206, 227, 202, 223; 370/332, 370/338, 401, 310, 342, 331, 231, 254
See application file for complete search history.

(56) References Cited

U.S. PATENT DOCUMENTS

| | | | |
|---|---|---|---|
| 8,407,720 B1* | 3/2013 | Chen et al. | 719/313 |
| 2001/0047514 A1* | 11/2001 | Goto | G06F 8/65 717/170 |
| 2004/0246939 A1* | 12/2004 | Koskiahde et al. | 370/351 |
| 2005/0183092 A1* | 8/2005 | Christensen | G06F 9/546 719/313 |
| 2006/0009204 A1* | 1/2006 | Ophir | H04M 3/42153 455/420 |
| 2007/0109966 A1* | 5/2007 | Lee et al. | 370/231 |
| 2008/0019330 A1* | 1/2008 | Hirano et al. | 370/338 |
| 2008/0117844 A1* | 5/2008 | Thubert et al. | 370/310 |
| 2009/0216345 A1* | 8/2009 | Christfort | G05B 19/0428 700/21 |
| 2010/0082860 A1* | 4/2010 | Murthy | 710/105 |
| 2010/0138501 A1* | 6/2010 | Clinton | G06F 15/16 709/206 |
| 2011/0038380 A1* | 2/2011 | Li et al. | 370/401 |
| 2011/0261800 A1* | 10/2011 | You | H04W 8/12 370/338 |
| 2012/0090017 A1* | 4/2012 | Herzog | H04L 12/5895 726/4 |
| 2015/0113567 A1* | 4/2015 | Scheer | 725/46 |

* cited by examiner

*Primary Examiner* — Thuong Nguyen
(74) *Attorney, Agent, or Firm* — Fountainhead Law Group P.C.

(57) ABSTRACT

In one embodiment a bi-directional channel bound to a messaging channel provides a connection allowing an application to send progress information created by a progress indicator program to a client computer over a network. The connection allows the progress information to be send upon the event of its creation.

20 Claims, 10 Drawing Sheets

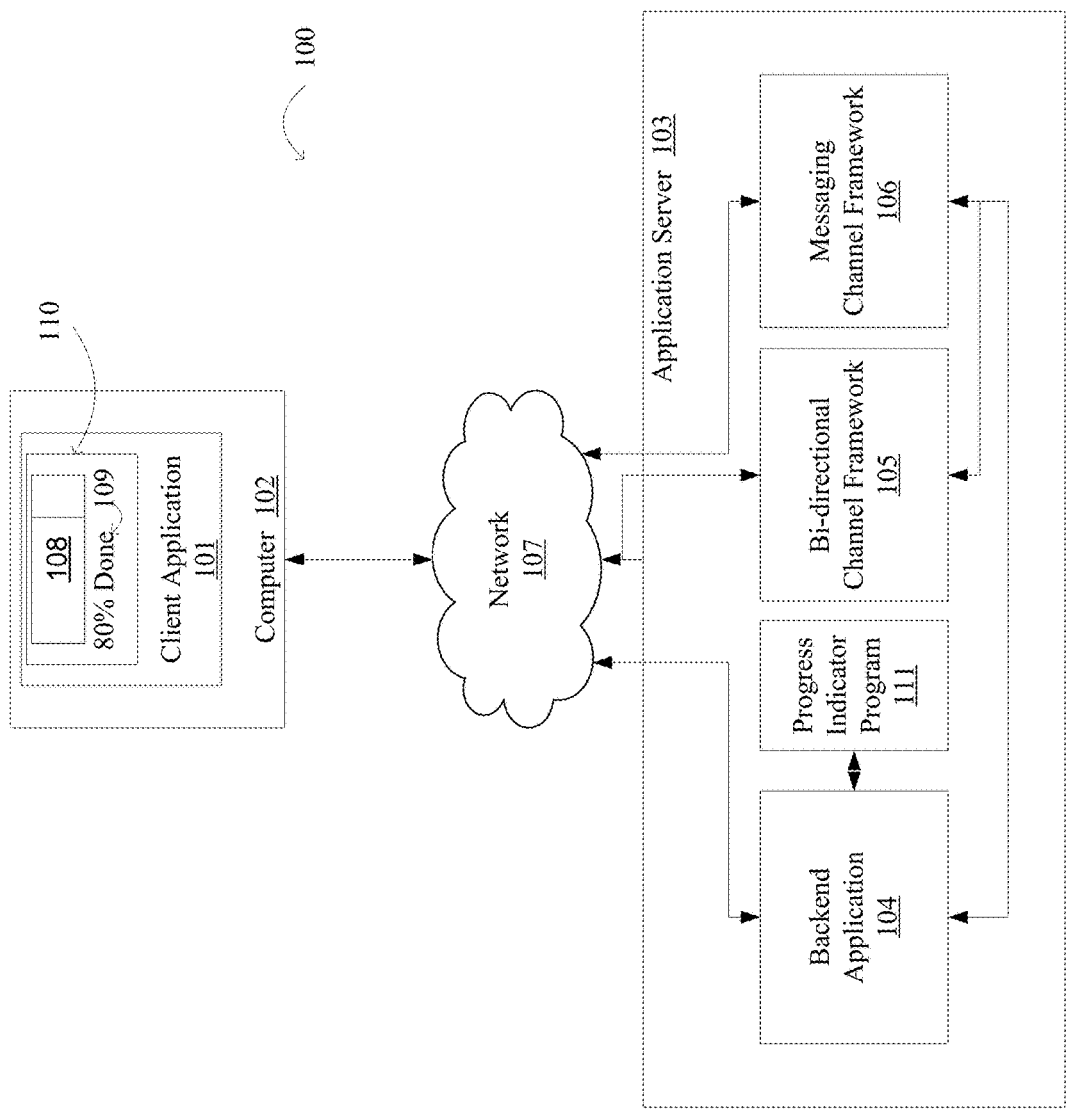

| CL_AMC_CHANNEL_MANAGER |
|---|
| +CREATE_MESSAGE_PRODUCER(in channel_group_id: CHANNEL_GRP_ID in channel_id: CHANNEL_ID):IF_AMC_MESSAGE_PRODUCER_<TYPE><br>+CREATE_MESSAGE_CONSUMER( in channel_group_id: CHANNEL_GRP_ID in channel_id: CHANNEL_ID):IF_AMC_MESSAGE_CONSUMER |

Fig. 8A

| IF_AMC_MESSAGE_PRODUCER |
|---|
|  |

△

| IF_AMC_MESSAGE_PRODUCER_<TYPE> |
|---|
| +SEND( in message: <TYPE> ) |

Fig. 8B

| IF_AMC_MESSAGE_CONSUMER |
|---|
| +START_MESSAGE_DELIVERY()<br>+STOP_MESSAGE_DELIVERY() |

Fig. 8C

| IF_AMC_MESSAGE_RECEIVER_<TYPE> |
|---|
| +RECEIVE( in message : <TYPE> in context: IF_AMC_MESSAGE_CONTEXT ) |

Fig. 8D

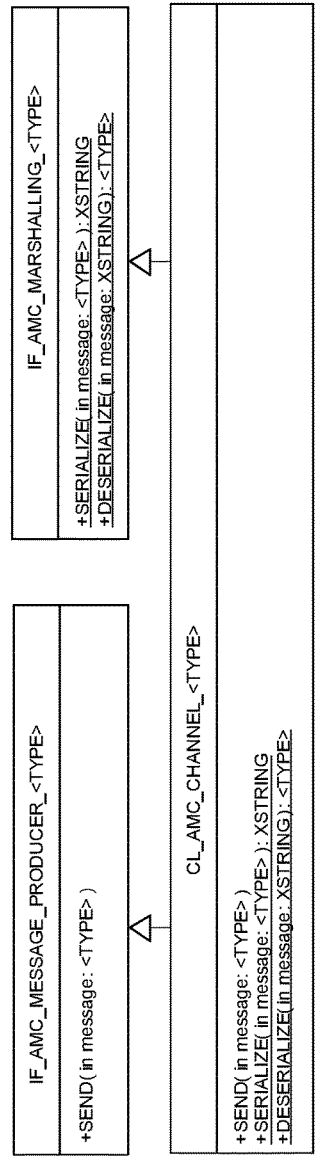

BI-DIRECTIONAL CHANNEL-BASED PROGRESS INDICATOR

BACKGROUND

Unless otherwise indicated herein, the approaches described in this section are not prior art to the claims in this application and are not admitted to be prior art by inclusion in this section.

User interfaces establishing application sessions on servers through a network may benefit from obtaining progress indicators related to tasks running in those sessions. But accessing available progress indicators is often unsatisfactory. Existing applications, which may already have progress indicator technology that runs beneath the application, must commonly re-implement the progress indicator function because the existing implementation is not compatible with a particular user interface (UI) technology. That is, the UI is expecting a certain type of response from the application and, as a result, the UI does not accept the progress indicator because it is not the expected type.

In addition, the available method of transferring progress information to a UI agent for the UI is based on polling technology. Polling-based progress indicators may lead to unnecessary network traffic and system load because the UI typically performs polling more often than the creation of new progress information by the application. Thus, in most cases, the UI does not receive any new progress information.

Polling technology issues also depend on the shared area used by the UI and the application. If the shared area is based on an application server assigned component, e.g., shared memory, polling may be an acceptable choice from the performance and resource consumption point of view, but load balancing must be disabled because load-balanced stateless requests do not work with such a shared area. On the other hand, using database tables as the shared area may address the load balancing issue, but may also lead to increased load and resource consumption on both the application and database servers.

SUMMARY

Embodiments of the claimed subject matter improve the use of certain progress indicators. In one embodiment, progress information is transmitted from an application to a user computer over a network. To do this the user computer initiates a session of the application, and initiates the creation of a bi-directional channel and the combination of that bi-directional channel with a messaging channel. The combination of the bi-directional channel and the messaging channel allow information to be transmitted from the application session to the user computer during the application session and upon the event of the information being created. The combination allows information to be transmitted from the application session to the user computer that the user computer might otherwise have to poll the application session to receive. To send information to the user computer, the application session first sends the information to the messaging channel, which forwards the information to the bi-directional channel, which forwards the information over the network to the user computer. When the information is received by the user computer, it is displayed by a web browser or other user agent.

Another aspect of an embodiment is that the information is not limited to progress information. Rather, the application session can transfer information produces by any function it calls to the user computer via the combination of the bi-directional channel and messaging channel.

An additional aspect of an embodiment is that multiple user computers may establish connections to the combination of the bi-directional channel and messaging channel and all receive the information sent by the application session.

The following detailed description and accompanying drawings provide a better understanding of the nature and advantages of the embodiments.

BRIEF DESCRIPTION OF THE DRAWINGS

FIG. 1 illustrates a bi-directional channel-based progress indicator according to one embodiment.

FIG. 8A depicts a table showing the channel factory class for creation of producer and consumer objects depending on the messaging channel.

FIG. 8B depicts a table showing the sender can send the associated message type <TYPE> to the related channel with the producer interface.

FIG. 8C depicts a table showing the receiver program is able to control the delivery and receiving phase of the messages, i.e. to start and stop the delivery of the messages with the consumer interface.

FIG. 8D depicts a table showing for asynchronous processing a callback method needs to be implemented for each associated message type <TYPE> according to the receiver interface.

FIG. 8E depicts a table showing a marshaling interface can be used for customized (de)serialization of messages of different types <TYPE>.

FIG. 8F depicts a table showing the AMC framework offers a default implementation for any message type.

FIG. 8G depicts a table showing connecting a WebSocket channel to a WebSocket session by framework.

FIG. 8H depicts a table showing connecting the WebSocket Channel to an AMC Channel to allow the publishing of messages from different user sessions to the WebSocket Client.

DETAILED DESCRIPTION

Figure 2A:
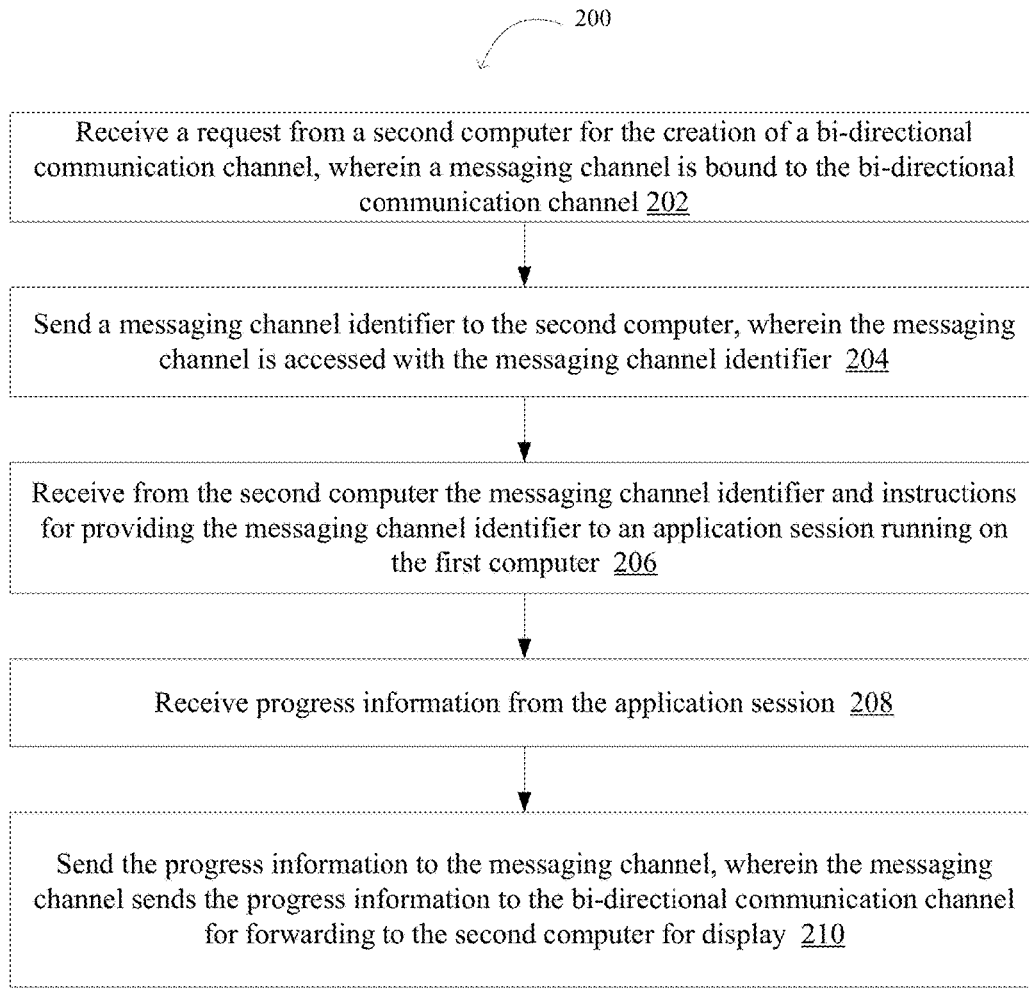
FIG. 2A illustrates a method for a bi-directional channel-based progress indicator according to an embodiment.

Described herein are techniques for creating a bi-directional channel-based progress indicator. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the embodiments. It will be evident, however, to one skilled in the art that the subject matter as defined by the claims may include some or all of the features in these examples alone or in combination with other features described below, and may further include modifications and equivalents of the features and concepts described herein.

FIG. 1 illustrates a bi-directional channel-based progress indicator 100 according to one embodiment. As illustrated in FIG. 1, a window of a client application 101 on a computer 102 displays a progress indicator 110, which includes a graphic indicator 108 and a text indicator 109. Different forms of progress indicator 110 may be appreciated, for example, symbols may be used.

The display of progress indicator 110 results from actions initiated by client application 101 with a backend application 104 via an application server 103 and a network 107, as follows. Client application 101 requests backend application 104 create an application session (also referred to as an "application" or "backend"). Backend application 104 creates an application session in response ("application" and "application session" will subsequently be used interchangeably).

Client application 101 uses bi-directional channel framework 105 and messaging channel framework 106 to provide progress indicator 110. A messaging channel is an infrastructure to exchange messages between applications and user interface sessions residing on different application servers within the same system. An example of such a system is the SAP ABAP Messaging Channel. ABAP Messaging Channels (AMC) use publish/subscribe messaging, in which participants communicate by sending and receiving messages referring to a channel asynchronously. A bi-directional communication channel enables bi-directional communication between and among application sessions and a user agent. An example of a bi-directional communication channel is the SAP Push Channel, which integrates Web Sockets into the SAP NetWeaver Application Server. WebSockets provide a bi-directional communications channel over a TCP/IP socket. The WebSocket may be implemented in web browsers and web servers.

Returning to FIG. 1, computer 102 requests that bi-directional communication channel framework 105 create a bi-directional channel session and bind a bi-directional channel to a messaging channel created by messaging channel framework 106.

Subsequently, bi-directional channel framework 105 may provide a messaging channel identifier to client application 101, which in turn provides the bi-directional channel identifier to the application session. When client application 101 sends a request to the application session that leads to the application session performing some action, the application session can send progress information from the execution of progress indicator program 111 to the messaging channel framework 106. In turn, messaging channel framework 106 forwards progress information to bi-directional channel framework 105, which relays the progress information via application server 103 and network 107 to client application 101 on computer 102. Client application 101 then displays the progress information as progress indicator 110.

In this embodiment, the combination of the bi-directional channel and the messaging channel allow computer 102 to make a second connection to the backend application session. While the first connection to the backend application is waiting for the response to the requested action, through this second connection the backend application session may deliver information to computer 102 upon the event of that information being created by the backend application, or a function run by the backend application. Such information may include progress information. Thus, computer 102 is also able to receive information from the backend application without having to poll the backend application.

The binding of the bi-directional channel to the messaging channel may be explicit or implicit. If explicit, an application session identifier is generated for each application session and used to create the bi-directional channel and messaging channel. If implicit, the user account, e.g., a user name and client, or other similar identifier, is used instead of the application session identifier. In an embodiment, the information that backend application session 104 sends to the messaging channel is not limited to progress information. Rather, backend application session 104 can send information produced by any function it calls to the client application via the combination of the bi-directional channel and messaging channel. For instance, backend application session 104 can forward logging or functional traces to the client application.

A benefit of the bi-directional channel-based progress indicator as discussed is that, if integrated into the progress indicator program, APIs and bi-directional channel connections established by the bi-directional channel framework are addressable in the whole system, like a database connection, and thus a load balancing issue cannot occur. The progress indicator API/program is extended such that the backend application is able to enable/disable the transfer of progress indicator information based on the bi-directional channel. Furthermore, depending on the underlying client application or user interface technology, different or customizable elements can be used for displaying the progress indicator information.

Backend application 104, progress indicator program 111, bi-directional channel framework 105, and messaging channel framework 106 may reside on application server 103, or may be distributed on a system of servers that are shown as application server 103. In one embodiment, application server 103 may be a cloud computing system executing software programs that are provided as software services (e.g., Software-as-a-Service). Application server 103 may connect to other remote systems such as one or more additional computers (not shown) over network 107, for example. Network 107 is illustrative of one or more networks for communicating information with other computer systems, such as a cellular communication system, an Ethernet network, the Internet, or a wireless network, for example. Computer 102 may be a personal desktop computer, laptop computer, or mobile computing device such as a mobile phone, a smartphone, or a tablet computer, for example. Such a computer may include one or more processors and memory for storing instructions to perform a wide variety of features and functions, including the features described herein. Computer 102 may receive and send information from/to backend application 104 and bi-directional channel framework 105 using client application 101. Client application 101 may be a local program, such as a browser or other user agent, for example, but client application 101 could be any client application with the capability to interface with backend application 104, bi-directional communication channel framework 105, and messaging channel framework 106, such as an HTML-5-enabled browser.

FIG. 2A illustrates a method 200 for providing a bi-directional channel-based progress indicator according to an embodiment. This embodiment describes the bi-directional channel-based progress indicator from the point of view of the application server 103 (FIG. 1) running backend application 104 (FIG. 1). At 202, backend application server 103 receives a request from a second computer 102 for the creation of a bi-directional communication channel, and a messaging channel is bound to the bi-directional communication channel. This bi-directional communication channel may be, for example, a WebSocket connection, or the implementation of a bi-directional communication channel in the SAP Advanced Business Application Programming (ABAP) environment that is known as an ABAP Push Channel (APC). And the messaging channel may be, for example the SAP ABAP messaging channel. At 204, backend application server 103 may send a messaging channel identifier to second computer 102, wherein the messaging channel is accessed with the messaging channel identifier. At 206, backend application server 103 may receive from the second computer 102, the messaging channel identifier and instructions for providing the messaging channel identifier to a backend application session running on backend application server 103. The messaging channel identifier may not need to be exchanged because the second computer 102 may be able to determine the identifier via the application identifier and predetermined messaging channel. The backend application session may be, for example, a Web Dynpro session, which is a proprietary web application technology developed by SAP AG that focuses on the development a server-side business application. Subsequently, second computer 102 may request an action from the backend application session that results in the backend application session executing a progress indicator program. If a progress indicator program is executed, at 208 backend application server 103 receives progress information from the backend application session. And at 210, backend application server 103 sends the progress information to the messaging channel, and the messaging channel sends the progress information to the bi-directional communication channel for forwarding to the second computer for display. As progress is generally incremental, steps 208 and 210 may be repeated multiple times during the running of the action requested by the application.

Figure 2B:
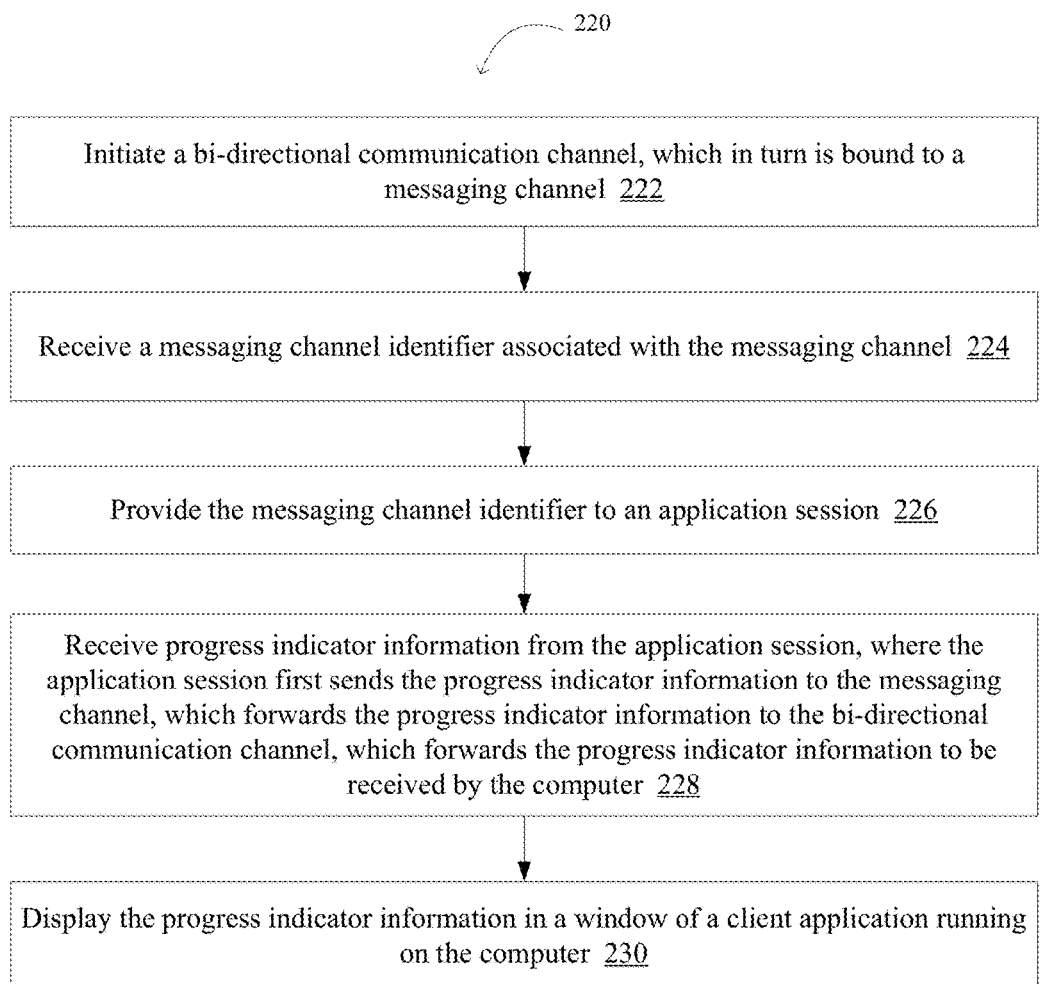
FIG. 2B illustrates a method for a bi-directional channel-based progress indicator according to an embodiment.

FIG. 2B illustrates a method 220 for providing a bi-directional channel-based progress indicator according to an embodiment. This embodiment describes the bi-directional channel-based progress indicator from the point of view of the computer 102 (FIG. 1) running client application 101 (FIG. 1), for example, a web browser communicating with an application over the Internet. At 222, computer 102 initiates the creation of a bi-directional communication channel, which in turn is bound to a messaging channel. This bi-directional communication channel may be, for example, a WebSocket connection, or the implementation of a bi-directional communication channel in the SAP Advanced Business Application Programming (ABAP) environment that is known as an ABAP Push Channel (APC). At 224, computer 102 may receive a messaging channel identifier associated with a messaging channel. At 226, the computer then may provide the messaging channel identifier to a backend application session. Subsequently, computer 102 may request an action from the backend application session that results in the backend application session executing a progress indicator program. If a progress indicator program is executed the backend application session sends the progress information to the messaging channel, which then forwards the progress information to the bi-directional communication channel, which then forwards the progress information. Thus, at 228, computer 102 receives progress information from the backend application session. At 230, computer 102 displays the progress information in a window of the client application 101. As progress is generally incremental, steps 208 and 210 may be repeated multiple times during the running of the action requested by the application.

Regarding both FIGS. 1, 2A, and 2B, it should be made clear that computer 102 is not polling the application to determine whether any progress has been made. Rather, upon the event of backend application 104 having new progress information, backend application 104 publishes progress information to the messaging channel, which then forwards the information through the bound bi-directional communication channel to the client application 101. In this manner, the embodiment avoids the unnecessary network traffic and system load potentially caused by polling, and the collateral issues of increased maintenance and administration effort.

Figure 3:
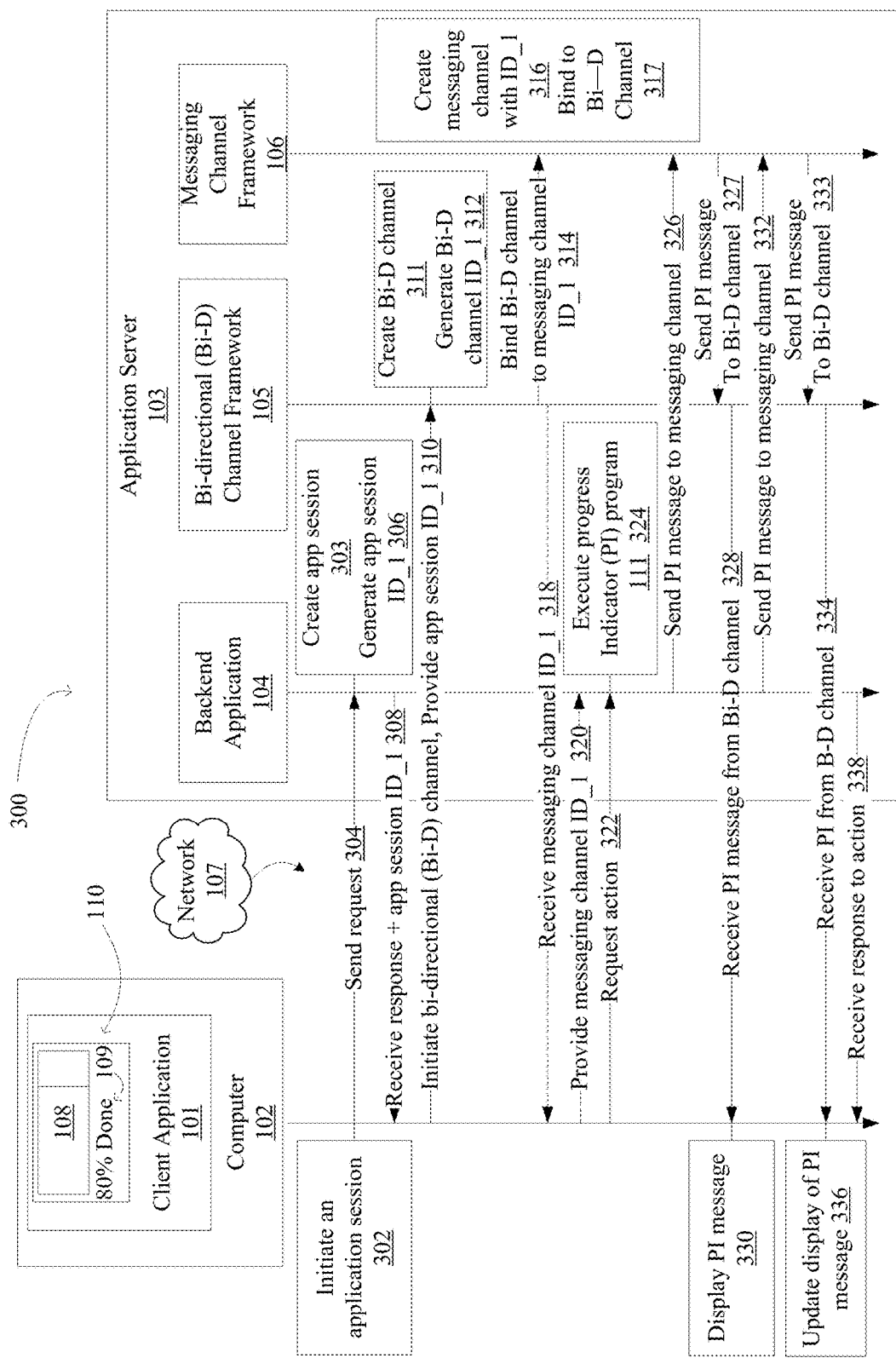
FIG. 3 illustrates a bi-directional channel-based progress indicator according to one embodiment.

FIG. 3 illustrates a flowchart 300 for a method of providing a bi-directional channel-based progress indicator 110 according to one embodiment. As illustrated in FIG. 3, a window of client application 101 on computer 102 displays progress indicator 110, which includes graphic indicator 108 and text indicator 109. The display of progress indicator 110 results from actions initiated by client application 101 with backend application 104 via network 107, as follows. At 302, client application 101 initiates a backend application session by, at 304, sending a request to backend application session 104 via network 107 and application server 103. At 303, backend application 104 creates a backend application session and at 306, generates a backend application session identifier. At 308, client application 101 receives a response and the backend application session identifier from backend application 104. The received response is typically in the form of a browser window displaying an application interface.

At 310, client application 101 then initiates a bi-directional channel session and provides the backend application session identifier in sending a request via network 107 and application server 103 to bi-directional channel framework 105. At 311, bi-directional channel framework 105 then creates a bi-directional communication channel and, at 312, generates a bi-directional session identifier. At 314, bi-directional channel framework 105 initiates binding the channel to a messaging channel with a bi-directional channel identifier (not shown). At 316, the messaging channel framework 106 creates a messaging channel with respect to the backend application session identifier. At 317, the messaging channel framework 106 binds the messaging channel to the bi-directional communication channel. The binding of the bi-directional channel session to the messaging channel is further described below in FIG. 4. In an optional step, at 318, bi-directional channel framework 105 then acknowledges the creation of the messaging channel and client application 101 receives the acknowledgment and the messaging channel identifier. The messaging channel identifier may not be provided to client application 101 because client application 101 can determine the messaging channel identifier using the application session ID_1 and a predefined messaging channel. In another optional step, at 320, client application 101 then provides backend application session 104 with the messaging channel identifier 320 via network 107. The messaging channel identifier is used to identify and transfer the progress information from the backend application session to the client application 101 connected to the bi-directional channel.

Backend application session 104 and client application 101 may now also communicate with each other via the messaging channel. Using the messaging channel bound to the bi-directional communication channel, client application 101 now may indirectly receive messages from backend application session 104 that client application 101 is not prepared to receive via the established connection with backend application session 104. Backend application session 104 is typically not able to deliver information, such as progress information created by progress indicator program 111, to client application 101 through the connection used to make a request, during the pendency of that request. The display of progress information will now be discussed further.

Continuing with FIG. 3, during backend application session 104, at 322, computer 102 requests an action be performed by backend application session 104. In this step, the activation of the progress indicator infrastructure may take place if this not done before. After backend application session 104 executes the request (not shown) with respect to any user interaction. At 324, during execution, a progress indicator program may be initiated, and backend application session 104 executes progress indicator program 111. After client application 101 sends the request, client application 101 is expecting a response to that request. However, backend application session 104 is typically not able to deliver progress information created by progress indicator program 111 to client application 101 through the connection established to make the request during the pendency of the request. However, the combination of the messaging channel and the bi-directional communication channel provide an alternate route in which backend application session 104 may communicate progress information to client application 101. Thus, while the functionality of progress indicator program 111 is not available to client application 101, the functionality does not need to be re-implemented multiple times to supply client applications that use different technologies with progress information. Rather, information created by progress indicator program 111 may be delivered to client application 101 by an alternate route, as discussed in the embodiments.

Returning to FIG. 3, at 326, backend application session 104 forwards the progress information to the messaging channel. The messaging channel then publishes the progress information to all subscribers, which currently in this embodiment includes the bi-directional communication channel and the backend application session 104. In other words, binding the bi-directional communication channel to the messaging channel made the bi-directional communication channel a subscriber to the messaging channel. A basic function of a messaging channel is to publish all information the messaging channel receives to all subscribers to that messaging channel—a single messaging channel may have multiple subscribers. Thus, at 327, the messaging channel forwards the progress information to the bound bi-directional communication channel, which forwards the progress information over network 107 so that, at 328, computer 102 receives progress information from the backend application session 104. At 330, computer 102 then displays the progress information in a window of client application 101 as progress indicator 110. While backend application session 104 processes the action, it is typical that progress indicator program 111 creates additional progress information until backend application session 104 completes the action. At 332, backend application session 104 will again send progress information to the messaging channel, which, at 333, will publish the progress information to the bound bi-directional communication channel session, and, at 334, computer 102 receives the progress information from the session over network 107. At 336, computer 102 then updates progress indicator 110 in the window of client application 101.

Figure 4:
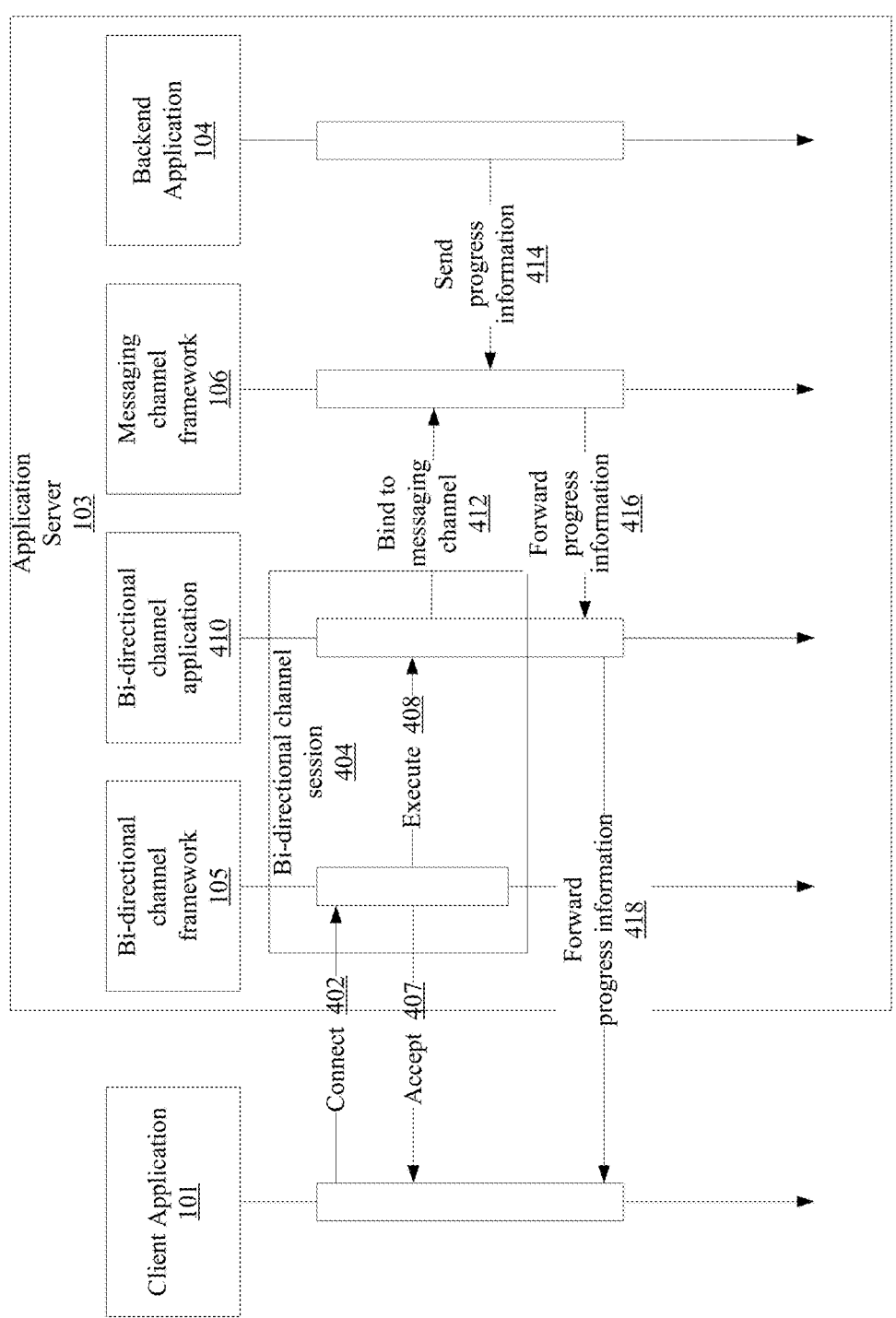
FIG. 4 illustrates interactions within a bi-directional channel-based progress indicator according to one embodiment.

FIG. 4 further illustrates the interaction between the bi-directional channel framework 105 and the messaging channel framework 106 in further detail. In FIG. 4, network 107 is not shown, but it should be understood that communications between client application 101 and application server 103 are carried over network 107, as shown in FIGS. 1 and 3. Indeed, since application server 103 may comprise a plurality of servers connected by way of network 107, and since backend application session 104, bi-directional framework 105, and messaging channel framework 106 may also reside disbursed on servers connected by way of network 107, it should be further understood that all interactions pictured or discussed in FIG. 4, and in fact also FIGS. 1, 2, and 3, may take place over network 107.

Returning to FIG. 4, at 402, client application 101 connects with bi-directional channel framework 105 to initiate a bi-directional channel. At 407, bi-directional framework 105 acknowledges the connection with an acceptance and, at 408, executes bi-directional channel application 410 (hereinafter "bi-directional channel 410"). Bi-directional channel session 404 includes bi-directional channel framework 105 and bi-directional channel 410. At 412, bi-directional channel session 404 prompts messaging channel framework 106 to create a messaging channel and binds bi-directional channel 410 to the messaging channel. The messaging channel also receives an associated identifier (not shown). Thus, when at 414, backend application session 104 sends (or "publishes") progress information to the identified messaging channel, at 416, the messaging channel forwards the progress information to bi-directional channel 410 (a "subscriber"), which in turn forwards the progress information to client application 101.

Because a number of messaging channels are permitted by messaging channel framework 106, backend application session 104 preferably receives information regarding which particular messaging channel to send progress indicator at 414. Both client application 101 and backend application session 104 are initially unaware of the creation of the messaging channel, and vice-versa. But the messaging channel was requested by and bound to bi-directional channel 410, which is in communication with client application 101. By that communication pathway, the messaging channel identifier may be forwarded by bi-directional channel 410 to client application 101. Client application 101 may then forward the messaging channel identifier to backend application session 104.

Figure 5:
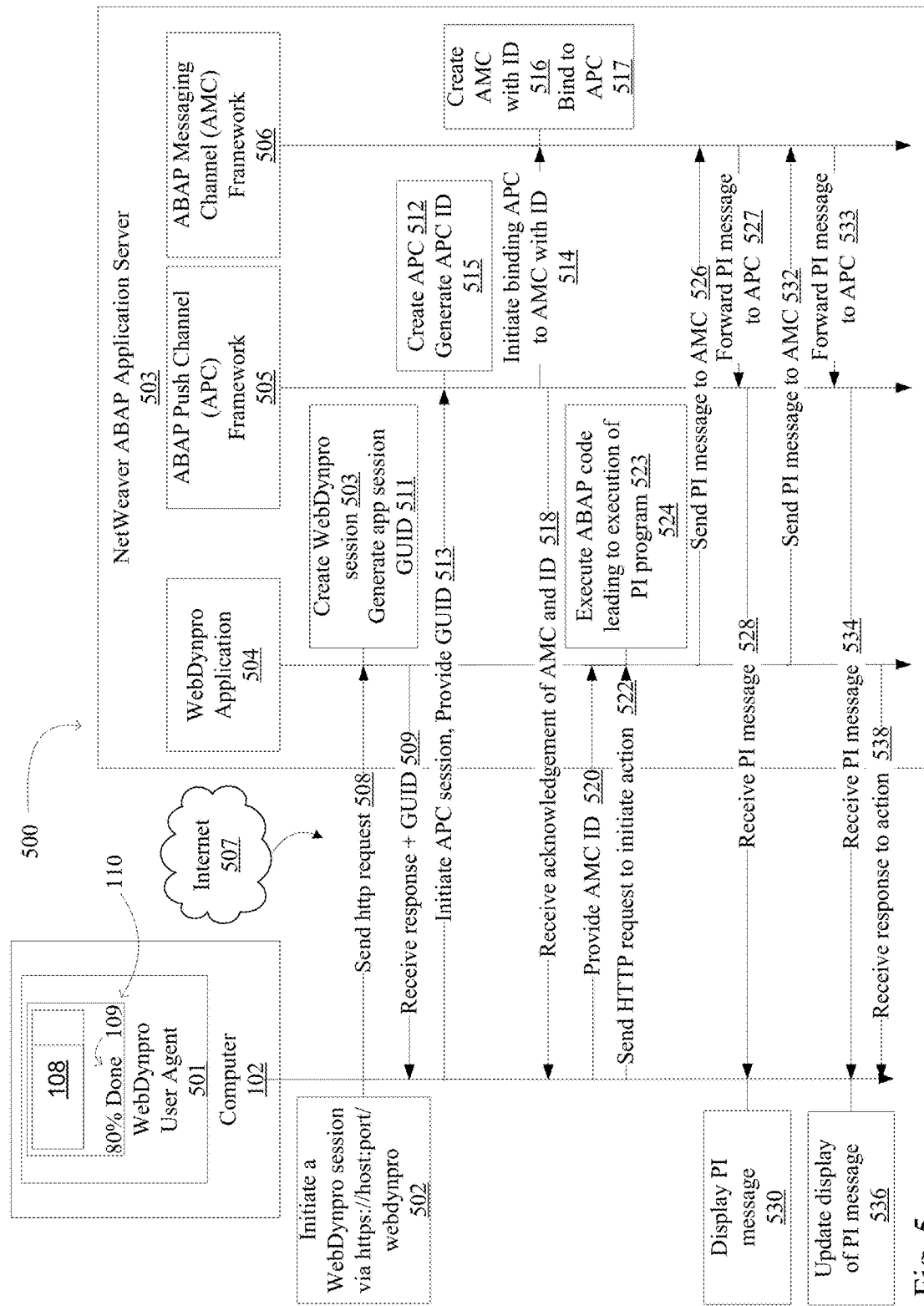
FIG. 5 illustrates an example of an Advanced Business Application Programming (ABAP) bi-directional channel-based progress indicator according to one embodiment.

In one embodiment, the bi-directional communication channel functionality is performed by the SAP version known as the ABAP Push Channel. FIG. 5 illustrates an example of an Advanced Business Application Programming (ABAP) bi-directional channel-based progress indicator 500 according to one embodiment. As illustrated in FIG. 5, a window of the Web Dynpro user agent 501 on computer 102 displays progress indicator 110, which in this example is based on information generated by a SAP graphical user interface (SAPGUI) progress indicator program 523. Progress indicator 110 again includes graphic indicator 108 and text indicator 109. The display of progress indicator 110 results from actions initiated by Web Dynpro user agent 501 with Web Dynpro application 504 via NetWeaver ABAP application server 503 and internet 507, as follows. At 502, Web Dynpro user agent 501 initiates a Web Dynpro application session by sending an http request 508 to Web Dynpro application 504. An example of a format for such an http request is: https://host:port/Web Dynpro. At 503, Web Dynpro application 504 creates a Web Dynpro application session (hereinafter "Web Dynpro session" and "Web Dynpro application" will be used interchangeably) and, at 511, generates an Web Dynpro session graphical user identifier (GUID). An example format for such a GUID is: <guid_1>. At 509, Web Dynpro user agent 501 receives a response and the GUID from Web Dynpro application 504. The received response would typically comprise a Web Dynpro session screen.

At 513, Web Dynpro user agent 501 initiates an ABAP Push Channel (APC) and provides the GUID, sending a request via internet 507 and application NetWeaver ABAP application server 503 to APC framework 505. At 512, APC framework 505 creates an APC with an identifier, binds the APC to an ABAP messaging channel (AMC) and at 515 creates an APC identifier. An example format for such an AMC identifier is/Web Dynpro/<guid_1>, which references the GUID of the Web Dynpro application session 504. The binding of the APC to the AMC follows the discussion regarding FIG. 4, above. At 516, AMC framework 506 creates an AMC and an AMC identifier and, at 517, the AMC is bound to the APC. At 518, APC framework 505 then acknowledges the creation of the AMC and Web Dynpro user agent 501 receives the acknowledgment and AMC identifier. At 520, Web Dynpro user agent 501 then provides Web Dynpro application 504 with the AMC identifier.

Web Dynpro application 504 and Web Dynpro user agent 501 may now communicate with each other via the AMC. With the AMC bound to the APC, Web Dynpro user agent 501 now may indirectly receive messages from Web Dynpro application 504 that Web Dynpro user agent 501 is not prepared to receive directly from Web Dynpro application 504, such as, for example, information from SAPGUI progress indicator program 523. The display of progress indicator 110 will now be discussed further.

Continuing with FIG. 5, at 522, computer 102 sends an HTTP request to initiate an action to be performed by Web Dynpro session 504. An example of an action is an asynchronous remote function call, which leads to screen outputs, such as Web Dynpro or list processing, which themselves result in the execution of progress indicator programs. At 524, after executing the request (not shown), Web Dynpro session 504 executes SAPGUI progress indicator program 523. Since, after executing the request, Web Dynpro user agent 501 is expecting a response to that request, Web Dynpro session 504 is typically not able to deliver progress information created by SAPGUI progress indicator program 523 directly to Web Dynpro user agent 501 during the pendency of the request. However, the combination of the messaging channel and the bi-directional communication channel provide an alternate route with which Web Dynpro session 504 may communicate progress information to Web Dynpro user agent 501.

At 526, Web Dynpro application 504 forwards the SAPGUI progress indicator information to the AMC. At 527, the AMC then publishes the progress information to all subscribers, which currently in this example is the APC. Thus, at 527, AMC framework 506 forwards the progress information to the bound APC, which, at 528, forwards it over internet 507 so that, at 528, computer 102 receives SAPGUI progress indicator information. At 530, computer 102 then display progress indicator 110 (which in this example is based the SAPGUI progress indicator information) in a window of Web Dynpro user agent 501. Should the action not be complete, it is typical that additional SAPGUI progress indicator information will be created. At 532, Web Dynpro application 504 will again send SAPGUI progress indicator information to the AMC, which, at 533, will in turn publish the SAPGUI progress indicator information to the bound APC, with, at 534, computer 102 receiving the SAPGUI progress indicator information. At 536, computer 102 then updates the display of progress indicator 110.

Figure 6:
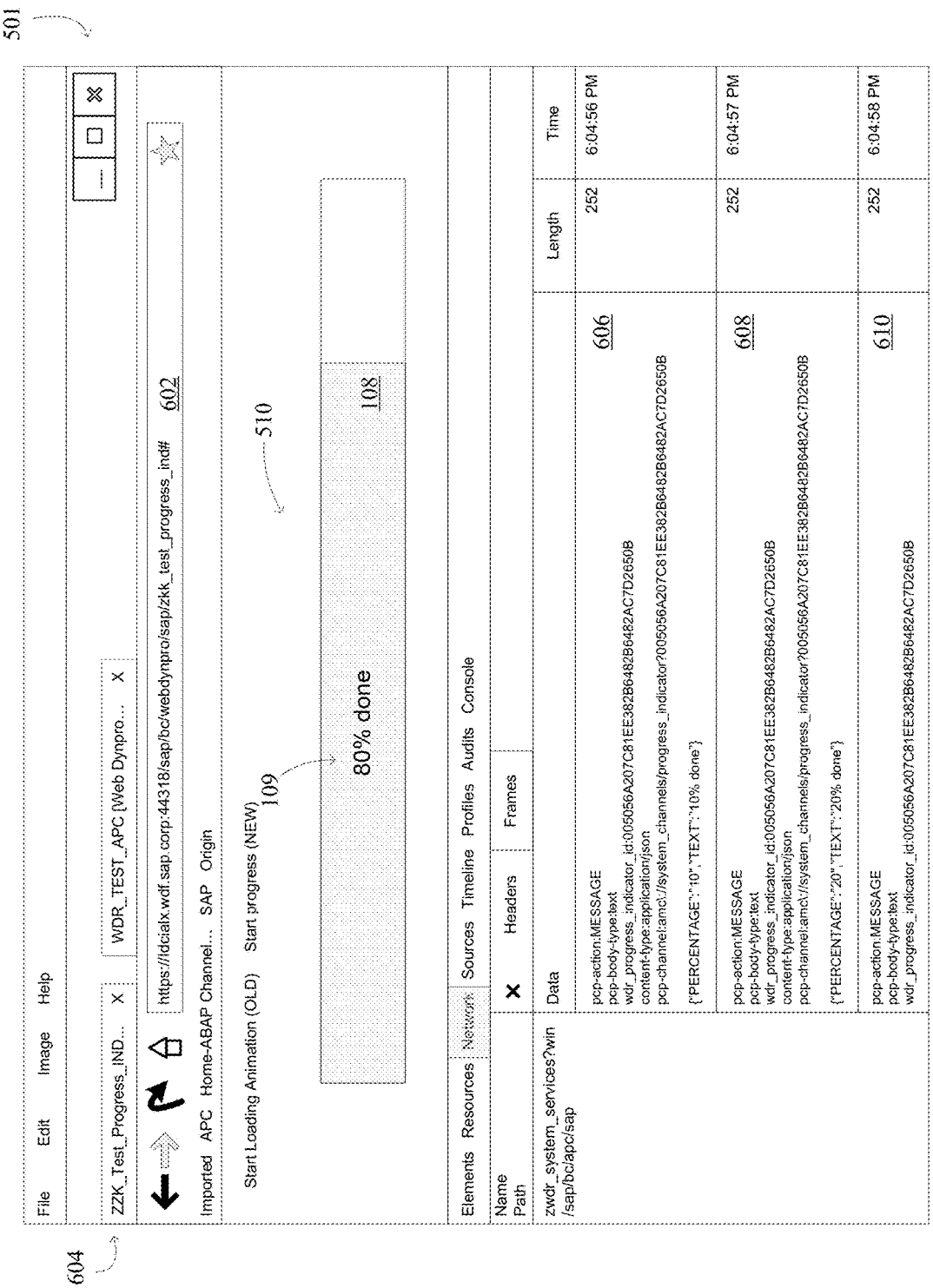
FIG. 6 illustrates an example of an Advanced Business Application Programming (ABAP) bi-directional channel-based progress indicator according to one embodiment.

FIG. 6 illustrates an example display of an ABAP push channel-based progress indicator (as discussed regarding FIG. 5) in a window of a Web Dynpro user agent 501. In FIG. 6, information from SAPGUI progress indicator program 523 is shown as a combination of text indicator 109 imposed on graphic indicator 108. Within the window of Web Dynpro user agent 501 is a further example of an http request 602, which in this instance requested the execution of the application "zzk_text_progress_ind" 604. The window shows examples 606, 608, and 610 of information generated by SAPGUI progress indicator program 523. In this example, the information generated by the SAPGUI progress indicator program is a self-executing message that results in both the graphic indicator 108 and the text indicator 109. The SAPGUI progress indicator includes two pieces of information for the percentage and description of the progress. For example, {"PERCENTAGE":"10", "TEXT":"10% done"} describe the progress percentage (10%) of certain business process.

Regarding the example discussed in FIGS. 5 and 6, SAP NetWeaver ABAP provides the basic functionality for the progress indicator (i.e., the SAPGUI progress indicator). The example integrates a dedicated bi-directional communication channel, i.e., the ABAP Push Channel, a messaging channel, i.e., the ABAP Messaging Channel, and a SAPGUI progress indicator, to extend progress indicator functionality to the client application (e.g., user interface).

In the example, the AMC are maintained in an ABAP development workbench and are realized as development objects with transport capabilities. Each channel has the following attributes:

Channel Group ID (name space): The name space or supposed Channel Group ID is used to build up a container to specify various channels which belongs to same area. An example of a Channel Group ID might be "AMC_CHAT"

Channel ID: The identifier for a single channel belonging to the same Channel Group ID. The addressing of channels requires both the Channel Group ID and the Channel ID. An example of a Channel ID might be "/chat/system" or "/chat/team."

Channel Access Scope: The Channel Access Scope defines whether a channel is cross-client or client-specific, for example, by checking a box. With the latter, the exchange of messages can be limited to sessions residing in the same client. Otherwise messages are exchanged cross-client.

Channel Access Right: The access rights for the channels are realized via code based authorization. For each channel, and depending on the access role, i.e., as consumer or producer, a list of ABAP reports, function groups, classes, or the like is accessed and access granted or denied. An example of Channel Access Right might be "MA_ISM_COMSUME_MESSAGE" or "MA_ISM_SEND_MESSAGE."

Receiver Interface (specification of receiver class): The delivery of the messages to the receiver session is handled via callback methods. For each channel a class has to be specified that implements the channel-specific receiver interface. An example of a Receiver Interface might be "CL_ISM_HDL_PING."

The messages exchanged by the AMC have a type. For each channel a data dictionary data type is assigned and only messages of this type can be transferred over the channel.

With the following APIs the transfer of messages of any type <TYPE> on a dedicated ABAP messaging channel can be performed:

FIG. 8A depicts a table showing the channel factory class for creation of producer and consumer objects depending on the messaging channel.

With the producer interface the sender can send the associated message type <TYPE> to the related channel as shown in a table in FIG. 8B.

With the consumer interface the receiver program is able to control the delivery and receiving phase of the messages, i.e. to start and stop the delivery of the messages as shown in a table in FIG. 8C.

For asynchronous processing a callback method needs to be implemented for each associated message type <TYPE> according to the receiver interface as shown in a table in FIG. 8D.

A default (de)serialization is offered. For customized (de)serialization of messages of different types <TYPE> the following marshaling interface can be used as shown in a table in FIG. 8E.

The AMC framework offers a default implementation for any message type as shown in a table in FIG. 8F with the exception of application specific receiver interfaces as shown in a table in FIG. 8D.

The WebSocket framework offers the following capabilities.

Connecting a WebSocket channel to a WebSocket session as shown in a table in FIG. 8G by framework:

Sending messages to the WebSocket Client as shown in a table in FIG. 8H

Figure 7:
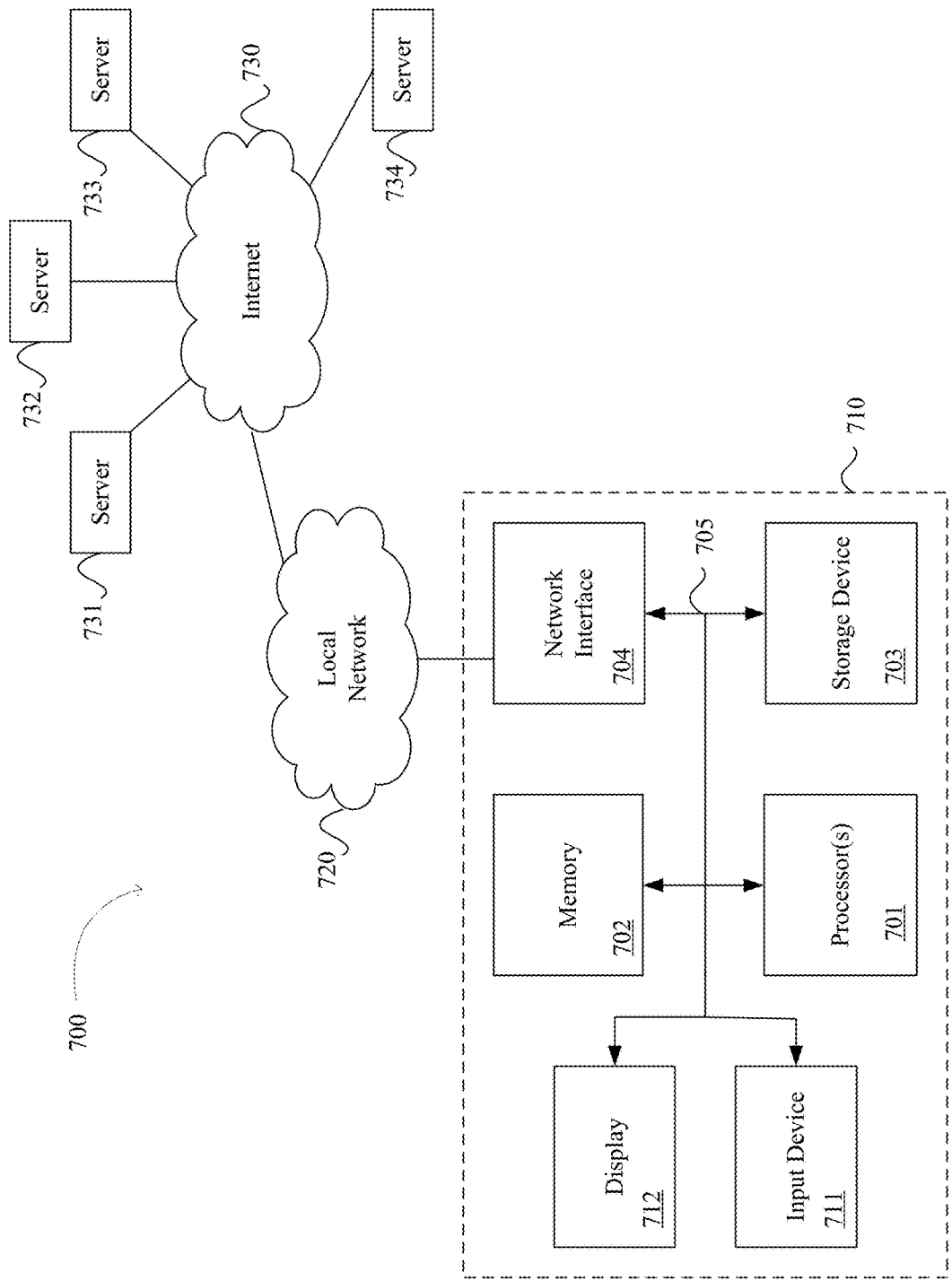
FIG. 7 illustrates hardware of a special purpose computing machine configured with a process according to one embodiment.

Connecting the WebSocket Channel to an AMC Channel to allow the publishing of messages from different user sessions to the WebSocket Client as shown in a table in FIG. 8H Example Hardware FIG. 7 illustrates hardware of a special purpose computing machine configured with a process according to the above disclosure. The following hardware description is merely one example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701, including information and instructions for performing some of the techniques described above, for example. This memory may also be used for storing programs executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums.

Computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

Computer system 710 also includes a network interface 704 coupled with bus 705. Network interface 704 may provide two-way data communication between computer system 710 and a local network 720. The network interface 704 may be a wireless or wired connection, for example. Computer system 710 can send and receive information through the network interface 704 across a local area network, an Intranet, a cellular network, or the Internet, for example. In the Internet example, software components or services may reside on multiple different computer systems 710 or servers 731-735 across the network. The processes described above may be implemented on one or more servers, for example. A server 631 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving, by a first computer system, a first request from a second computer system though a first connection for a creation of a bi-directional communication channel;
creating, by the first computer system, the bi-directional communication channel and a messaging channel in response to receiving the first request;
subscribing, by the first computer system, the bi-directional communication channel to the messaging channel, wherein the messaging channel is a publish-subscribe channel that sends messages asynchronously and the bi-directional communication channel is subscribed to receive messages asynchronously published by the messaging channel;
receiving, by the first computer system from the second computer system, a second request to perform an action using an application session running on the first computer system through the first connection;
determining, by the first computer system, progress information that is generated by a progress indicator program from an event occurring in the application session while performing the action using the application session, wherein the application session is not able to deliver the progress information to the second computer system directly through the first connection during the pendency of the second request; and sending, by the first computer system, the progress information to the messaging channel from the application session during the pendency of the second request, wherein the messaging channel sends the progress information to the bi-directional communication channel due to the bi-directional communication channel being subscribed to receive messages published by the messaging channel, the progress information for forwarding by the bi-directional communication channel to the second computer system via a second connection from the bi-directional communication channel to the second computer system that is different from the first connection from the application session to the second computer system.

2. The method of claim 1, wherein the progress information comprises a self-executing function providing a display format for the progress information.

3. The method of claim 1, wherein the bi-directional communication channel comprises a first bi-directional communication channel and wherein the first bi-directional communication channel forwards the progress information to the second computer system for display by a first client application running on the second computer system, the method further comprising:

subscribing, by the first computer system, a second bi-directional communication channel to the messaging channel, wherein the second bi-directional channel is subscribed to receive messages published by the messaging channel; and sending, by the first computer system, the progress information to the messaging channel, wherein the messaging channel sends the progress information to the second bi-directional channel due to the bi-directional channel being subscribed to receive messages published by the messaging channel, the progress information for forwarding by the bi-directional channel to a second client application for display.

4. The method of claim 1, further comprising:

sending, by the first computer system, a messaging channel identifier to the second computer system, wherein the messaging channel is accessible using the messaging channel identifier; and receiving, by the first computer system, the messaging channel identifier from the second computer system and instructions for providing the messaging channel identifier to the application session running on the first computer for use to subscribe the bi-directional communication channel to the messaging channel.

5. The method of claim 1, further comprising:

receiving, by the first computer system, a third request to create the application session on the first computer system; and sending, by the first computer system, an application session identifier for the application session created on the first computer system, wherein the second computer system sends the application session identifier with the first request to create the bi-directional communication channel.

6. The method of claim 1, wherein the bi-directional communication channel forwards the progress information to the second computer system without receiving a polling request from the second computer system for the progress information.

7. The method of claim 1, wherein:

the messaging channel is configured to communicate with the application session, and the bi-directional communication channel is configured to communicate bi-directionally with a client application running on the second computer system.

8. A non-transitory computer readable storage medium storing one or more programs, the one or more programs comprising instructions for:

receiving, by a first computer system, a first request from a second computer system though a first connection for a creation of a bi-directional communication channel;

creating, by the first computer system, the bi-directional communication channel and a messaging channel in response to receiving the first request;

subscribing, by the first computer system, the bi-directional communication channel to the messaging channel, wherein the messaging channel is a publish-subscribe channel that sends messages asynchronously and the bi-directional channel is subscribed to receive messages asynchronously published by the messaging channel;

receiving, by the first computer system from the second computer system, a second request to perform an action using an application session running on the first computer system through the first connection;

determining, by the first computer system, progress information that is generated by a progress indicator program from an event occurring in the application session while performing the action using the application session, wherein the application session is not able to deliver the progress information to the second computer system directly through the first connection during the pendency of the second request; and sending, by the first computer system, the progress information to the messaging channel from the application session during the pendency of the second request, wherein the messaging channel sends the progress information to the bi-directional communication channel due to the bi-directional channel being subscribed to receive messages published by the messaging channel, the progress information for forwarding by the bi-directional channel to the second computer system via a second connection from the bi-directional channel to the second computer system that is different from the first connection from the application session to the second computer system.

9. The non-transitory computer readable storage medium of claim 8, wherein the progress information comprises a self-executing function providing a display format for the displayed progress information.

10. The non-transitory computer readable storage medium of claim 8, wherein the bi-directional communication channel comprises a first bi-directional communication channel and wherein the first bi-directional communication channel forwards the progress information to the second computer system for display by a first client application running on the second computer system, the method further comprising:

subscribing, by the first computer system, a second bi-directional communication channel to the messaging channel, wherein the second bi-directional channel is subscribed to receive messages published by the messaging channel; and sending, by the first computer system, the progress information to the messaging channel, wherein the messaging channel sends the progress information to the second bi-directional communication channel due to the bi-directional channel being subscribed to receive messages published by the messaging channel, the progress information for forwarding by the bi-directional channel to a second client application for display.

11. The non-transitory computer readable storage medium of claim 8, further comprising:
sending, by the first computer system, a messaging channel identifier to the second computer system, wherein the messaging channel is accessible using the messaging channel identifier; and
receiving, by the first computer system, the messaging channel identifier from the second computer system and instructions for providing the messaging channel identifier to the application session running on the first computer for use to subscribe the bi-directional communication channel to the messaging channel.

12. The non-transitory computer readable storage medium of claim 8, further comprising:
receiving a third request to create the application session on the first computer system; and
sending, by the first computer system, an application session identifier for the application session created on the first computer system, wherein the second computer system sends the application session identifier with the first request to create the bi-directional communication channel.

13. The non-transitory computer readable storage medium of claim 8, wherein the bi-directional communication channel forwards the progress information to the second computer system without receiving a polling request from the second computer system for the progress information.

14. The non-transitory computer readable storage medium of claim 8, wherein:
the messaging channel is configured to communicate with the application session, and
the bi-directional communication channel is configured to communicate bi-directionally with a client application running on the second computer system.

15. A computer-implemented method comprising:
sending, by a first computer system, a first request for creation of a bi-directional communication channel though a first connection, wherein the bi-directional communication channel and a messaging channel are created in response to receiving the first request, and wherein the bi-directional communication channel is subscribed to receive messages published by the messaging channel at a second computer system;
sending, by the first computer system, a second request through the first connection to perform an action using an application session running on the second computer system, wherein progress information is generated by a progress indicator program from an event occurring using the application session while performing the action in the application session, wherein the application session is not able to deliver the progress information to the first computer system directly through the first connection during the pendency of the second request;
receiving, by the first computer system, progress information from the bi-directional communication channel through a second connection from the bi-directional channel to the first computer system that is different from the first connection from the application session to the first computer system based on the application session performing the action during the pendency of the second request, wherein the application session sent the progress information to the messaging channel, and the messaging channel sent the progress information to the bi-directional communication channel due to the bi-directional channel being subscribed to receive messages published by the messaging channel; and
displaying, by the first computer system, the progress information.

16. The method of claim 15, wherein the progress information comprises a self-executing function providing a display format for the displayed progress information.

17. The method of claim 15, further comprising:
receiving, by the first computer system, a messaging channel identifier from the second computer system, wherein the messaging channel is accessible using the messaging channel identifier; and
sending, by the first computer system, the messaging channel identifier to the second computer system and instructions for providing the messaging channel identifier to the application session running on the first computer for use to subscribe the bi-directional communication channel to the messaging channel.

18. The method of claim 15, further comprising:
sending, by the first computer system, a third request to create the application session on the second computer system; and
receiving, by the first computer system, an application session identifier for the application session created on the second computer system; and
sending, by the first computer system, the application session identifier with the first request to create the bi-directional communication channel.

19. The method of claim 15, wherein the progress information to the second computer system is received from the bi-directional communication channel without the first computer system sending a polling request for the progress information.

20. The method of claim 15, wherein:
the messaging channel is configured to communicate with the application session, and
the bi-directional communication channel is configured to communicate bi-directionally with a client application running on the first computer system.

* * * * *